United States Patent Office.

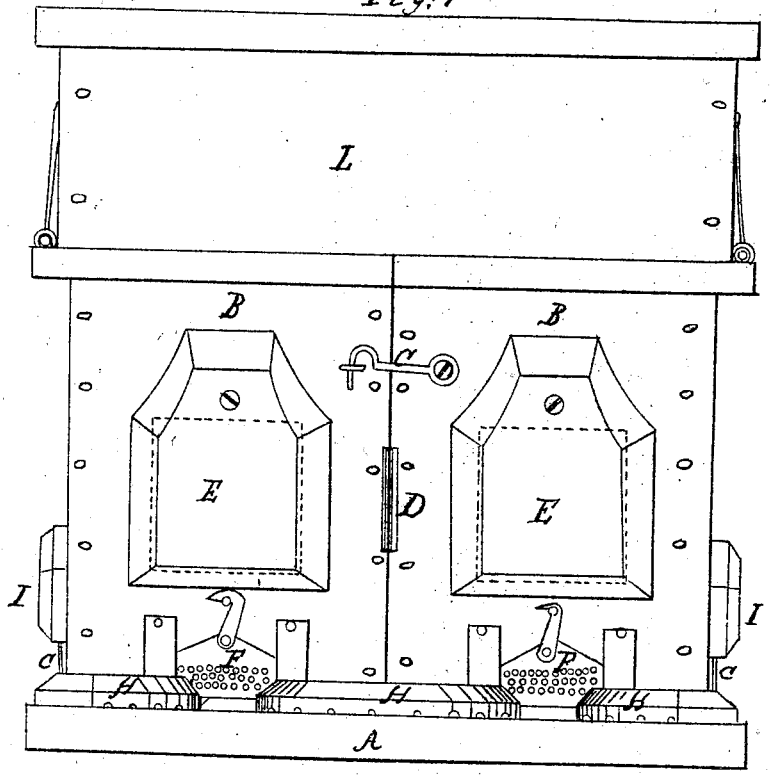

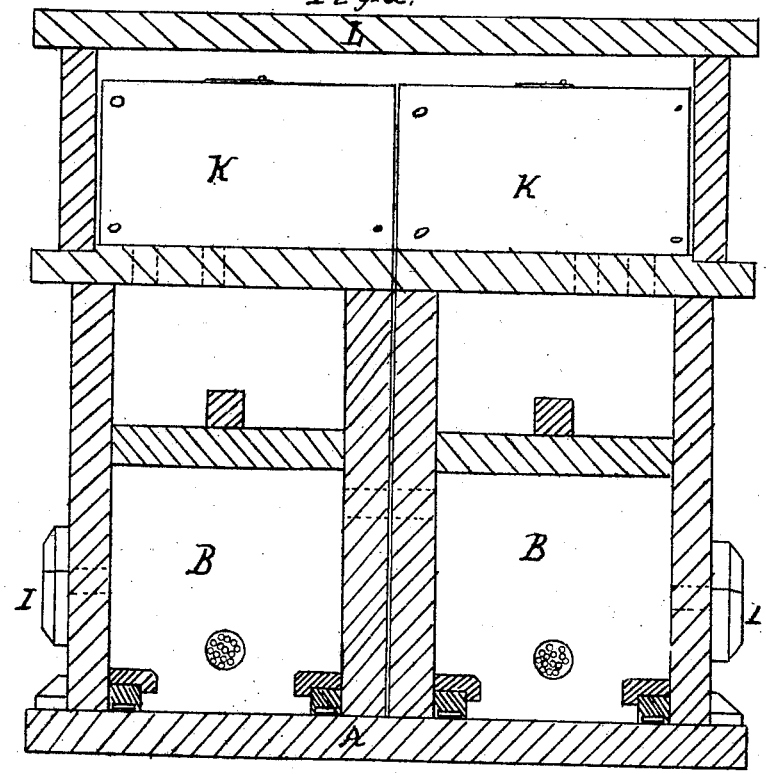
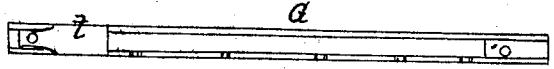

JACOB NEAL, OF ORLEANS, IOWA.

Letters Patent No. 73,915, dated January 28, 1868.

IMPROVEMENT IN BEE-HIVES.

*The Schedule referred to in these Letters Patent and making part of the same.*

TO ALL WHOM IT MAY CONCERN:

Be it known that I, JACOB NEAL, of Orleans, in the county of Appanoose, and in the State of Iowa, have invented certain new and useful Improvements in Bee-Hives; and do hereby declare that the following is a full, clear, and exact description thereof, reference being had to the accompanying drawings, and to the letters of reference marked thereon.

Figure 1 is a front elevation of my hive.

Figure 2 is a section view of the same.

Figure 3 is a view of one of the moth-catchers.

Letter A represents the platform on which the hive is placed.

Letter B represents two separate and distinct boxes, which are constructed, in every manner, exactly alike, and are clasped together by means of the hooks C. These boxes have openings (as seen by dotted lines in fig. 2) in their sides, so that the bees can pass freely and uninterruptedly from one box to the other.

D represents a slide, for the purpose of closing and opening the entrance between the two hives. This slide consists of a perforated metal plate, which works in a groove in the side of the box B, and is so formed that, by drawing it slightly outwards, the openings in the boxes are closed, and the bees prevented from communicating from one box to the other while being swarmed.

In the front of each of these hives there is placed a window, which is closed by means of the buttons E, so that should the moths succeed in getting into the hive, they can be seen through these windows, and removed before they can do any damage to the honey.

Letter F represents a perforated slide, for the purpose of closing up the bees, when desirable, and preventing them from entering the hive while the honey is being removed. These slides are perforated, so as to ventilate the hive when closed, and have small hooks attached to them, as seen in fig. 1, by means of which they are retained in their places after being raised.

In the bottom of each of the boxes B there are placed two or more moth-catchers, G, which consist of four slides, hollowed out on their under side, and have small notches, $y\ y$, in their sides, so that the moths can crawl under and deposit their eggs. Each of these moth-catchers has a small scraper attached to its inner end, so that, when you draw the catchers out, the scrapers sweep up the eggs, and draw them out with them. These scrapers are constructed of metal, in the form as seen at $t$, fig. 3.

Around the openings of the hives there are placed a number of blocks, H, which have small cavities cut on their under side, so that the moths and millers can creep under and lay their eggs, from whence they can be easily removed and destroyed.

For the purpose of driving the bees out of either or both of the boxes, when necessary, openings have been placed in their sides, (as shown by dotted lines at the points I in fig. 2,) so that smoke can be injected, whereby the bees are easily driven off, and the honey removed, without being troubled by them.

Upon the top of each of the boxes B there are placed two or more surplus-honey boxes or drawers, K, which are enclosed by the cap-piece L. The bees have entrances into the drawers K through small openings cut through the tops of the boxes B, as shown by dotted lines in fig. 2. The said openings are furnished with metal slides, (not shown in drawings,) so that the bees can be shut off from the drawers while the honey is being removed. There are small openings cut in the top of the drawers K, and furnished with covers, so that the bees can escape, in that way, after being shut off from the lower boxes, B.

In order to enable one to see when the drawers have been filled with honey, a glass plate has been inserted in the end of each of them. These plates are let into the drawers solid, there being much less danger of their being broken in that way than when they are made to slide in grooves.

When the bees get strong enough to swarm, the openings between the two boxes B are closed by means of the slide D, the cap-piece L is removed, and the boxes unhooked, when one of them is removed to a new platform, where a new half is attached to it, and the bees allowed to go to work again. When the bees are about to swarm, there will be a queen bee in each of the boxes B, and, by separating them, all the trouble and annoyance of swarming them is over at once, without being exposed to them or injuring the comb, and can be performed in less than five minutes.

In order to remove the old comb—which should be done every two years—the perforated slide F is closed, communication is cut off from the honey-drawers K, on the side that you want to clean, and smoke is then injected at the point I, which drives the bees from that side of the hive. The separating slides D are then drawn out, so as to close the entrance, and the box can then be turned up, and the old comb removed without injury to the new.

What I claim as new, and desire to secure by Letters Patent, is—

1. Providing the moth-slides G G with metal scrapers $t\ t$, when used in the boxes B B, in the manner and for the purposes specified.

2. The boxes B B, communicating as described, moth-slides G G, having scrapers $t\ t$, blocks H H, with their small cavities, perforated slides F F, and buttons E, the whole being constructed, arranged, and used in the manner and for the purposes set forth.

In testimony that I claim the foregoing, I have hereunto set my hand, this 15th day of July, 1867.

JACOB NEAL.

Witnesses:
    SAMUEL JORDAN,
    G. W. NASH.